(12) United States Patent
Karaffa et al.

(10) Patent No.: US 8,730,054 B2
(45) Date of Patent: May 20, 2014

(54) SYSTEMS AND METHODS TO CUSTOMIZE ALERT PRESENTATION

(75) Inventors: John Michael Karaffa, Roanoke, VA (US); Johnny Stephen Downor, Salem, VA (US); Steven William Smith, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 414 days.

(21) Appl. No.: 13/149,811

(22) Filed: May 31, 2011

(65) Prior Publication Data

US 2012/0310381 A1    Dec. 6, 2012

(51) Int. Cl.
G08B 21/00    (2006.01)

(52) U.S. Cl.
USPC .......... 340/679; 340/531; 340/691.1; 700/80; 700/108

(58) Field of Classification Search
USPC ......... 340/502, 517, 519, 521, 522, 531, 533, 340/540, 679, 691.1, 691.6; 700/80, 108; 715/700
See application file for complete search history.

(56) References Cited

U.S. PATENT DOCUMENTS

| | | | |
|---|---|---|---|
| 6,774,786 B1 * | 8/2004 | Havekost et al. | 340/517 |
| 6,965,309 B1 * | 11/2005 | Bleznyk et al. | 340/521 |
| 6,975,219 B2 | 12/2005 | Eryurek et al. | |
| 7,068,184 B2 | 6/2006 | Yee et al. | |
| 7,095,321 B2 * | 8/2006 | Primm et al. | 340/540 |
| 7,191,076 B2 | 3/2007 | Huber et al. | |
| 7,328,078 B2 | 2/2008 | Sanford et al. | |
| 7,579,947 B2 | 8/2009 | Peluso | |
| 8,260,736 B1 | 9/2012 | Lear et al. | |
| 2002/0019866 A1 | 2/2002 | Linzy | |
| 2003/0023518 A1 | 1/2003 | Spriggs et al. | |
| 2004/0143621 A1 | 7/2004 | Fredrickson et al. | |
| 2004/0186927 A1 | 9/2004 | Eryurek et al. | |
| 2004/0230328 A1 | 11/2004 | Armstrong et al. | |
| 2005/0007249 A1 * | 1/2005 | Eryurek et al. | 340/511 |
| 2005/0171704 A1 | 8/2005 | Lewis et al. | |
| 2005/0197803 A1 | 9/2005 | Eryurek et al. | |
| 2006/0025872 A1 | 2/2006 | Glanzer et al. | |
| 2006/0031577 A1 | 2/2006 | Peluso et al. | |
| 2006/0181427 A1 | 8/2006 | Bouse et al. | |
| 2006/0229738 A1 | 10/2006 | Bhandiwad et al. | |
| 2006/0259159 A1 | 11/2006 | Zielinski | |
| 2007/0124253 A1 | 5/2007 | Angerame et al. | |
| 2007/0129820 A1 | 6/2007 | Glanzer et al. | |
| 2007/0143324 A1 | 6/2007 | Eichhorst | |
| 2007/0240051 A1 | 10/2007 | Sherrill et al. | |
| 2007/0280287 A1 | 12/2007 | Samudrala et al. | |

(Continued)

OTHER PUBLICATIONS

U.S. Appl. No. 13/149,764, filed May 31, 2011, Karaffa et al.

(Continued)

*Primary Examiner* — Thomas Mullen
(74) *Attorney, Agent, or Firm* — Fletcher Yoder, P.C.

(57) ABSTRACT

In one embodiment, an industrial process control system includes a field device configured to provide an alert. The process control system also includes a graphical user interface configured to present an alarm for the alert, and an alarm server comprising a processor and configured to associate an alarm class with the alert. The alarm class includes a plurality of alarm attributes having a respective plurality of values, and the graphical user interface is configured to present the alarm for the alert based on the plurality of alarm attributes and the respective plurality of values.

20 Claims, 4 Drawing Sheets

(56) References Cited

U.S. PATENT DOCUMENTS

| | | |
|---|---|---|
| 2008/0004727 A1 | 1/2008 | Glanzer et al. |
| 2008/0079560 A1 | 4/2008 | Hall et al. |
| 2008/0168092 A1 | 7/2008 | Boggs et al. |
| 2008/0238713 A1 | 10/2008 | Banhegyesi et al. |
| 2008/0255782 A1 | 10/2008 | Bilac et al. |
| 2008/0311878 A1 | 12/2008 | Martin et al. |
| 2009/0058631 A1* | 3/2009 | Wall et al. ............. 340/517 |
| 2009/0066515 A1 | 3/2009 | Kangas |
| 2009/0124253 A1 | 5/2009 | Radic et al. |
| 2009/0276486 A1 | 11/2009 | Tandon et al. |
| 2009/0287789 A1 | 11/2009 | Dolan et al. |
| 2009/0292996 A1 | 11/2009 | Anne et al. |
| 2010/0107007 A1 | 4/2010 | Grohman et al. |
| 2010/0123594 A1 | 5/2010 | Schleiss et al. |
| 2010/0123722 A1 | 5/2010 | Grubbs et al. |
| 2010/0205244 A1 | 8/2010 | Todorov et al. |
| 2011/0022653 A1 | 1/2011 | Werth et al. |
| 2011/0054699 A1 | 3/2011 | Imes et al. |
| 2011/0078604 A1 | 3/2011 | Wilhelm et al. |
| 2012/0084431 A1 | 4/2012 | Syed et al. |

OTHER PUBLICATIONS

U.S. Appl. No. 13/149,789, filed May 31, 2011, Karaffa et al.
U.S. Appl. No. 13/149,816, filed May 31, 2011, Karaffa et al.
U.S. Appl. No. 13/149,826, filed May 31, 2011, Karaffa et al.
U.S. Appl. No. 13/149,597, filed May 31, 2011, Karaffa et al.
U.S. Appl. No. 13/149,833, filed May 31, 2011, Karaffa et al.
U.S. Appl. No. 13/149,803, filed May 31, 2011, Karaffa et al.
U.S. Appl. No. 13/149,660, filed May 31, 2011, Karaffa et al.
U.S. Appl. No. 13/149,706, filed May 31, 2011, Karaffa et al.
U.S. Appl. No. 13/149,746, filed May 31, 2011, Karaffa et al.
U.S. Appl. No. 13/040,917, filed Mar. 4, 2011, Nekkar et al.
U.S. Appl. No. 13/103,864, filed May 9, 2011, Ojha et al.
U.S. Appl. No. 13/106,741, filed May 12, 2011, Ojha et al.
http://zone.ni.com/devzone/cda/tut/p/id/3345, 12 pages, last viewed Aug. 2, 2011.

* cited by examiner

SYSTEMS AND METHODS TO CUSTOMIZE ALERT PRESENTATION

BACKGROUND

The subject matter disclosed herein relates to industrial control systems, and, more specifically, to customizing alerts for industrial control systems.

Certain systems, such as industrial control systems, may provide for control capabilities that enable the execution of control instructions in various types of devices, such as sensors, pumps, valves, and the like. Additionally, certain industrial control systems may include one or more graphical user interfaces that may be used to present details to an operator about the various devices present on the control system network. For example, a graphical user interface may present an operator with alerts that may contain alarm or diagnostic information about a device on the control system network.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an industrial process control system includes a field device configured to provide an alert. The process control system also includes a graphical user interface configured to present an alarm for the alert, and an alarm server comprising a processor and configured to associate an alarm class with the alert. The alarm class includes a plurality of alarm attributes having a respective plurality of values, and the graphical user interface is configured to present the alarm for the alert based on the plurality of alarm attributes and the respective plurality of values.

In another embodiment, a method includes receiving an alert from a field device of an industrial control system. The method also includes resolving the alert to an associated alarm class, wherein the associated alarm class comprises a plurality of presentation attributes not defined by the alert. The method also includes instructing a user interface to display an alarm for the alert based on a respective plurality of values of the plurality of presentation attributes for the associated alarm class.

In another embodiment, a non-transitory, tangible computer readable medium includes executable code, the code including instructions for receiving a selection of an alert of a field device from a user interface. The code also includes instructions for defining an alarm class, wherein the alarm class comprises a plurality of presentation attributes having a respective plurality of values. The code also includes instructions for associating the alarm class with the alert of the field device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The FIELDBUS FOUNDATION® standard includes the concept of FIELDBUS FOUNDATION® alerts, which are used by FIELDBUS FOUNDATION® devices to inform a controller or other component of an industrial control system of events or alarms that devices may experience. However, the FIELDBUS FOUNDATION® alert does not include parameters to control how the alerts may be presented to the operator. That is, the FIELDBUS FOUNDATION® standard only defines how alerts are communicated within the control system network.

The embodiments discussed below provide for creation of user-defined alarm classes using a workstation of an industrial control system. Accordingly, the disclosed embodiments include the creation of alarm classes defined within the industrial control system that may be associated with, and extend the functionality of, (i.e., wrap) the underlying FIELDBUS FOUNDATION® alerts, allowing the operator to customize the presentation of alerts associated with each alarm class using a plurality of presentation attributes.

Figure 1:
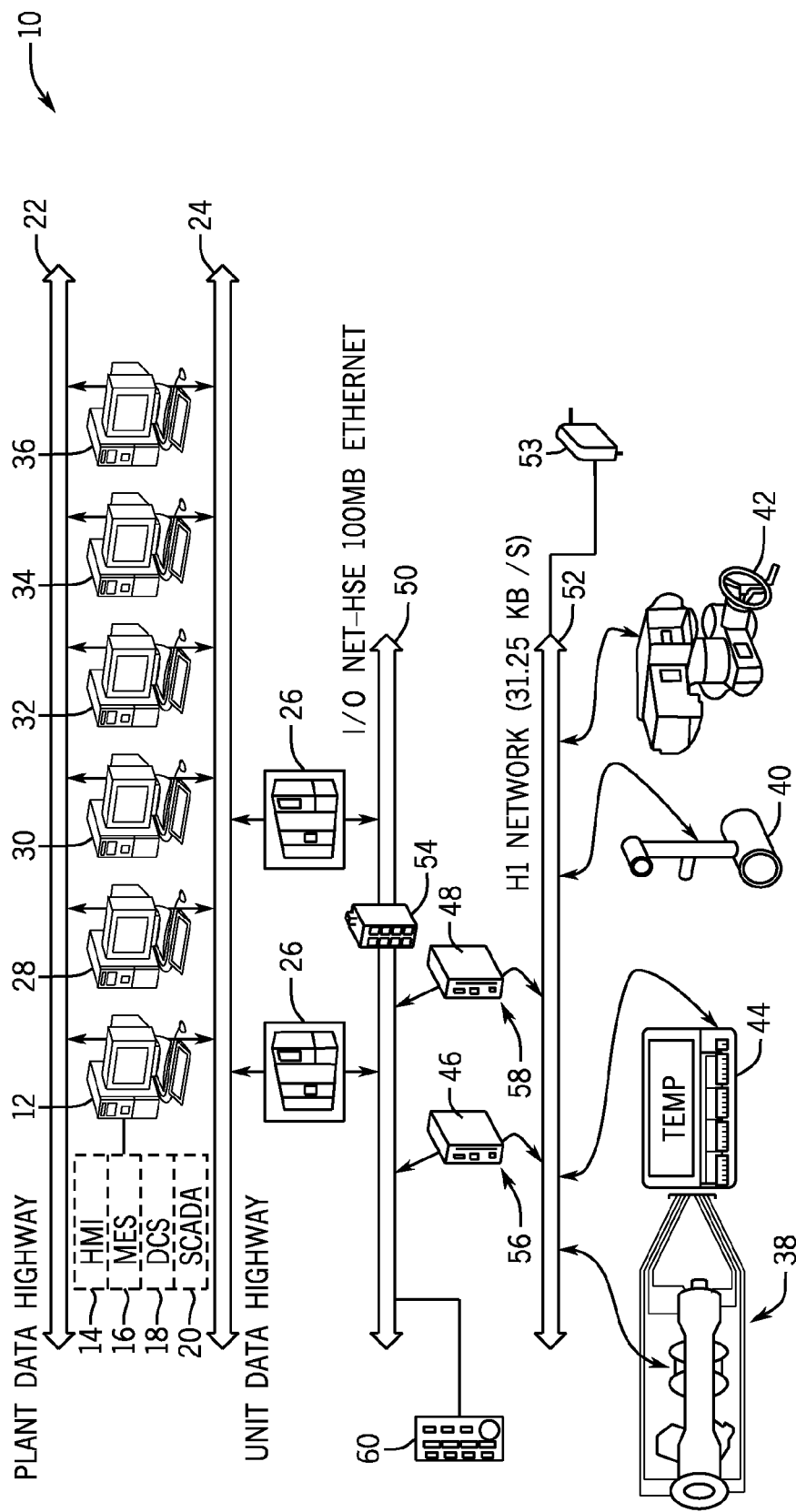
FIG. 1 is a schematic diagram of an embodiment of an industrial control system.

With the foregoing in mind, turning to FIG. 1, an embodiment of an industrial process control system 10 is depicted. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host industrial control software, such as human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Co., of Schenectady, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, and a computer 36 hosting an alarm viewer. In certain embodiments, a computer 34 may host the ToolboxST™ software, available from General Electric Co., of Schenectady, N.Y. Other computers coupled to the plant data highway 22 and/or the unit data highway 24 may include computers hosting Cimplicity™ or ControlST™ software.

The system 10 may include any number and suitable configuration of industrial controllers 26. For example, in some embodiments the system 10 may include one industrial controller 26 or two, three, or more industrial controllers 26 for redundancy. The industrial controllers 26 may enable control logic useful in automating a variety of plant equipment, such as a turbine system 38, a valve 40, and a pump 42. Indeed, the industrial controller 26 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), and so forth.

In the depicted embodiment, the turbine system 38, the valve 40, the pump 42, and the temperature sensor 44 are communicatively interlinked to the automation controller 26 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as one of the industrial controllers 26, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/O Net 50 and the H1 network 52. Accordingly, a variety of devices may be linked to the industrial controller 26 and to the computer 12. For example, the devices, such as the turbine system 38, the valve 40, the pump 42, and the temperature sensor 44, may include industrial devices, such as FIELDBUS FOUNDATION® devices that include support for the FIELDBUS FOUNDATION® H1 bi-directional communications protocol. In such an embodiment, a power supply 53, such as a Phoenix Contact Fieldbus Power Supply available from Phoenix Contact of Middletown, Pa., may also be coupled to the H1 network 52 and may be coupled to a power source, such as AC or DC power. The devices 38, 40, 42, and 44 may also include support for other communication protocols, such as those included in the HART® Communications Foundation (HCF) protocol, and the PROFIBUS® Nutzer Organization e.V. (PNO) protocol.

Each of the linking devices 46 and 48 may include one or more segment ports 56 and 58 useful in segmenting the H1 network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58, may enable a physical separation useful in maintaining fault tolerance, redundancy, and improving communications time. In some embodiments, additional devices may be coupled to the I/O NET 50. For example, in one embodiment an I/O pack 60 may be coupled to the I/O NET 50.

Figure 2:
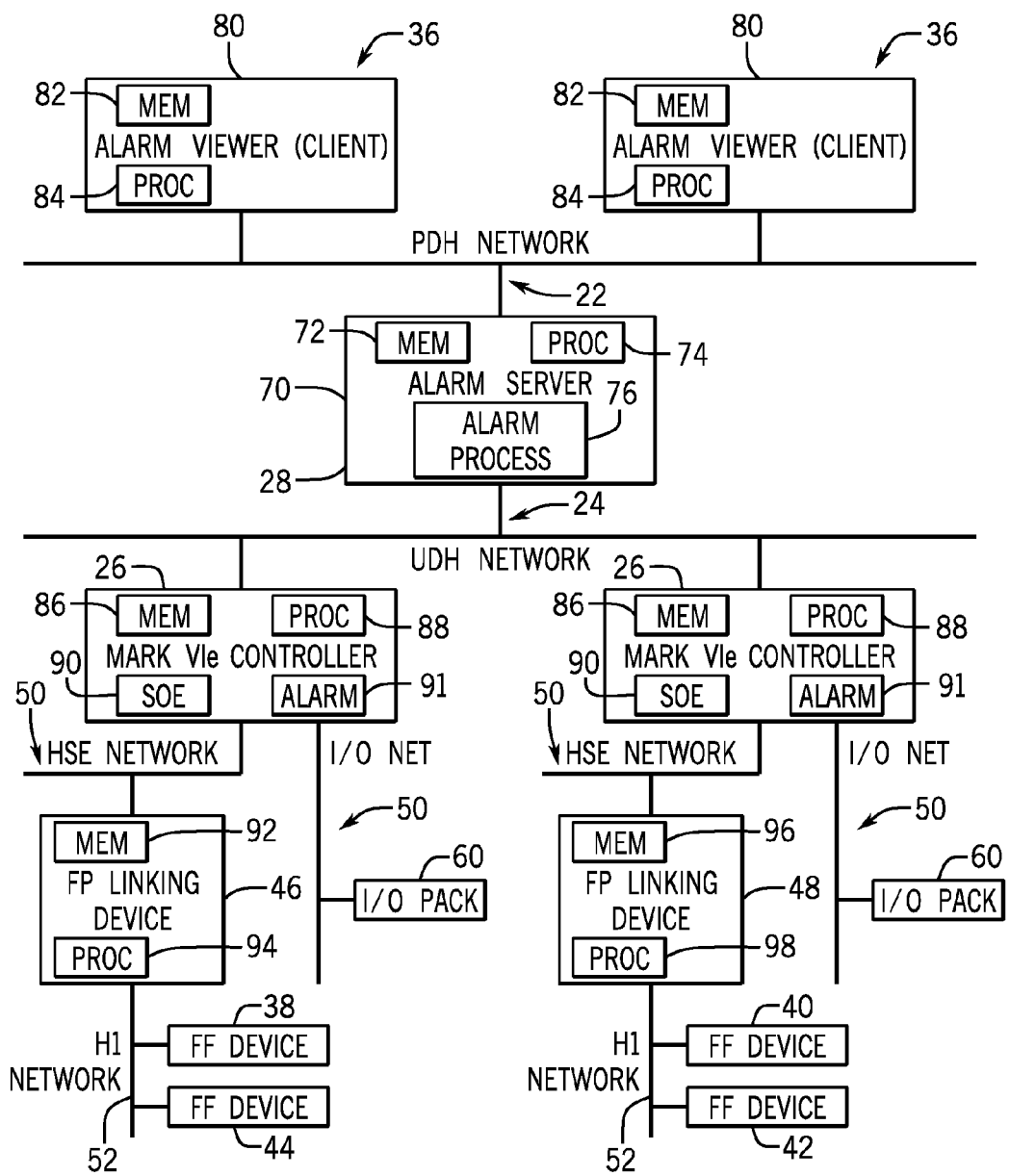
FIG. 2 is another schematic diagram of an embodiment of an industrial control system.

In certain embodiments, the devices 38, 40, 42, and 44 may provide data, such as alerts, to the system 10. These alerts may be handled in accordance with the embodiments described below. FIG. 2 depicts a block diagram of an embodiment of the system 10 depicting various components in further detail. As described above, the system 10 may include an alarm server 70, executed on the computer 28, coupled to the plant data highway 22 and the unit data highway 24. The computer 28 may include a memory 72, such as non-volatile memory and volatile memory, and a processor 74, to facilitate execution of the alarm server 70. The alarm server 70 may execute an alarm process 76 for receiving, processing, and responding to alarms received from the controllers 26.

The system 10 may include additional computers 36 coupled to the plant data highway 22 that may execute alarm viewers 80. The alarm viewers 80 may enable a user to view and interact with the alarms processed by the alarm server 70. The computers 36 may each include a memory 82 and a processor 84 for executing the alarm viewer 80. Additionally, in some embodiments, the alarm viewers 80 may be executed on the computer 28 or any of the computers described above in FIG. 1. The alarm server 70 may communicate with the alarm viewers 80 using any suitable alarm data protocol interpretable by the alarm viewers 80.

As described above, the controllers 26 are coupled to the unit data highway 24, and the controllers 26 may communicate with the alarm server 70 over the unit data highway 24. For example, in one embodiment, the controllers 26 and alarm server 70 may communicate using a serial data interface (SDI) alarm protocol. The controllers 26 may each include a memory 86 and a processor 88 for executing the functions of the controllers 26. In one embodiment, the controllers 26 may execute a sequence of events (SOE) process 90 and an alarm process 91. As mentioned above, the controllers 26 may be coupled to the I/O pack 60 over the I/O NET 50. In one embodiment, the I/O pack 60 may communicate with the controllers 26 using the ADL protocol.

As also described above, the controllers 26 may be coupled to linking devices 46 and 48 through an I/O NET 50. The linking devices 46 and 48 may communicate with the controllers 26 over the I/O NET 50. The linking devices 46 and 48 may be coupled to the H1 network 52, and one linking device 46 may be coupled to devices 38 and 44 and another linking device 48 may be coupled to device 40 and 42. The linking device 46 may include a memory 92, such as volatile and non-volatile memory, and a processor 94, and the linking device 48 may include a memory 96, such as volatile and non-volatile memory, and a processor 98. In one embodiment, the linking devices 46 and 48 may communicate with the controllers 26 using the FIELDBUS FOUNDATION® protocol.

The system 10 may enable alert and diagnostic information to be communicated from the various devices to a user, such as through the HMI 14 and the alarm viewers 80. For example, the Foundation Fieldbus devices 38, 40, 42, and 44 may provide an alert to the controller 26. The alert may be provided from the controller 26 to the alarm server 70, which may process the alert and provide information to the HMI 14, the alarm viewers 80, or any other computers coupled to the unit data highway 24 or plant data highway 22.

As such, the FIELDBUS FOUNDATION® standard relies on the concept of FIELDBUS FOUNDATION® alerts, which are used by FIELDBUS FOUNDATION® devices (e.g., devices 38, 40, 42, and 44) to communicate to the system controllers (e.g., controller 26) alarms and diagnostic information regarding the status of the devices. However, FIELDBUS FOUNDATION® alerts do not include parameters to define or customize how the alerts may be presented to the operator. That is, while the FIELDBUS FOUNDATION® protocol defines how alerts are communicated across the control system network, the presentation of the alert is not defined by the FIELDBUS FOUNDATION® protocol. For example, whether the controller 26 receives a "High Limit Alarm Alert" (i.e., "HI_ALM") or a "Low Limit Alarm Alert" (i.e., "LO_ALM") from the FIELDBUS FOUNDATION® device (e.g., any of devices 38, 40, 42, and 44), the controller 26 may present the alerts to the operator with the same general appearance (e.g., same background color, same text color, etc.).

Figure 3:
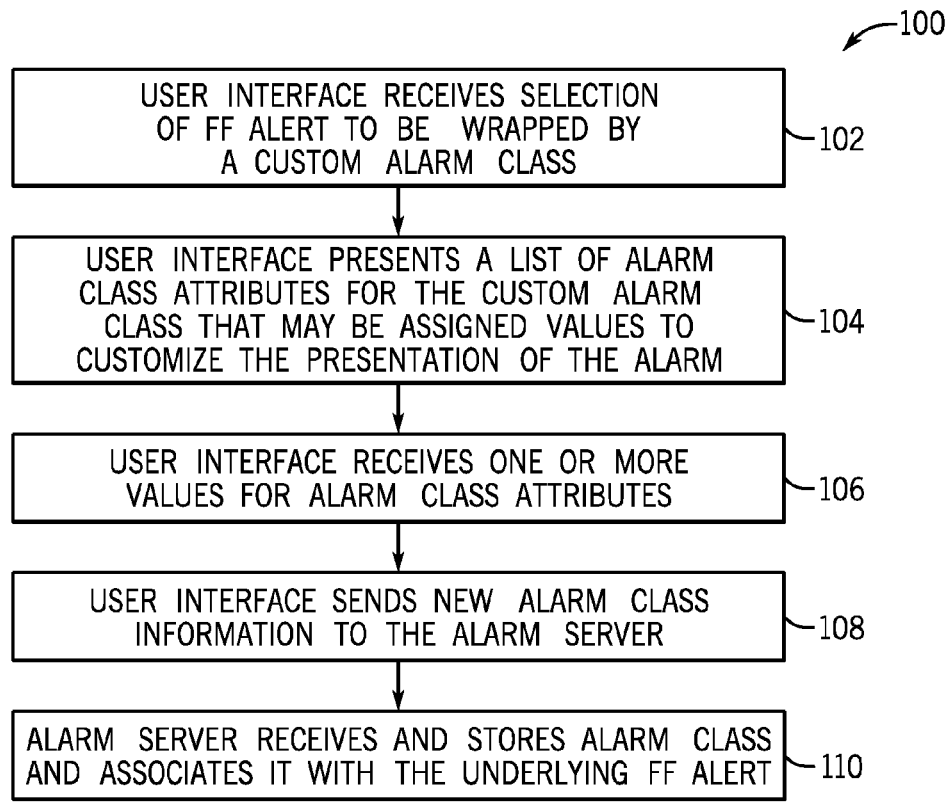
FIG. 3 is a block diagram of an embodiment of a process for defining an alarm class for a FIELDBUS FOUNDATION alert.
Figure 5:
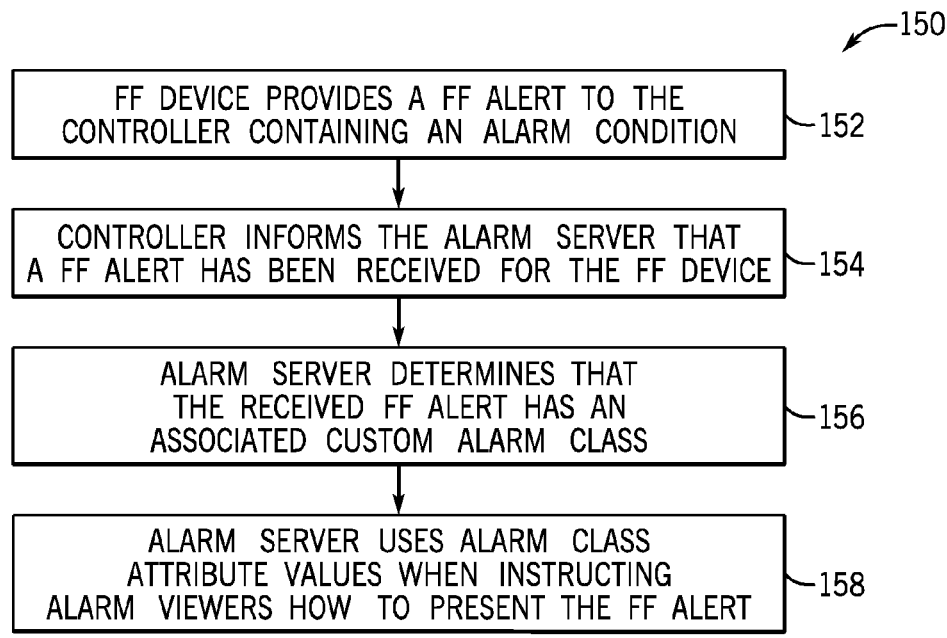
FIG. 5 is a block diagram of an embodiment of a process for presenting a FIELDBUS FOUNDATION® alert using the attributes defined in the alarm class.
Figure 4:
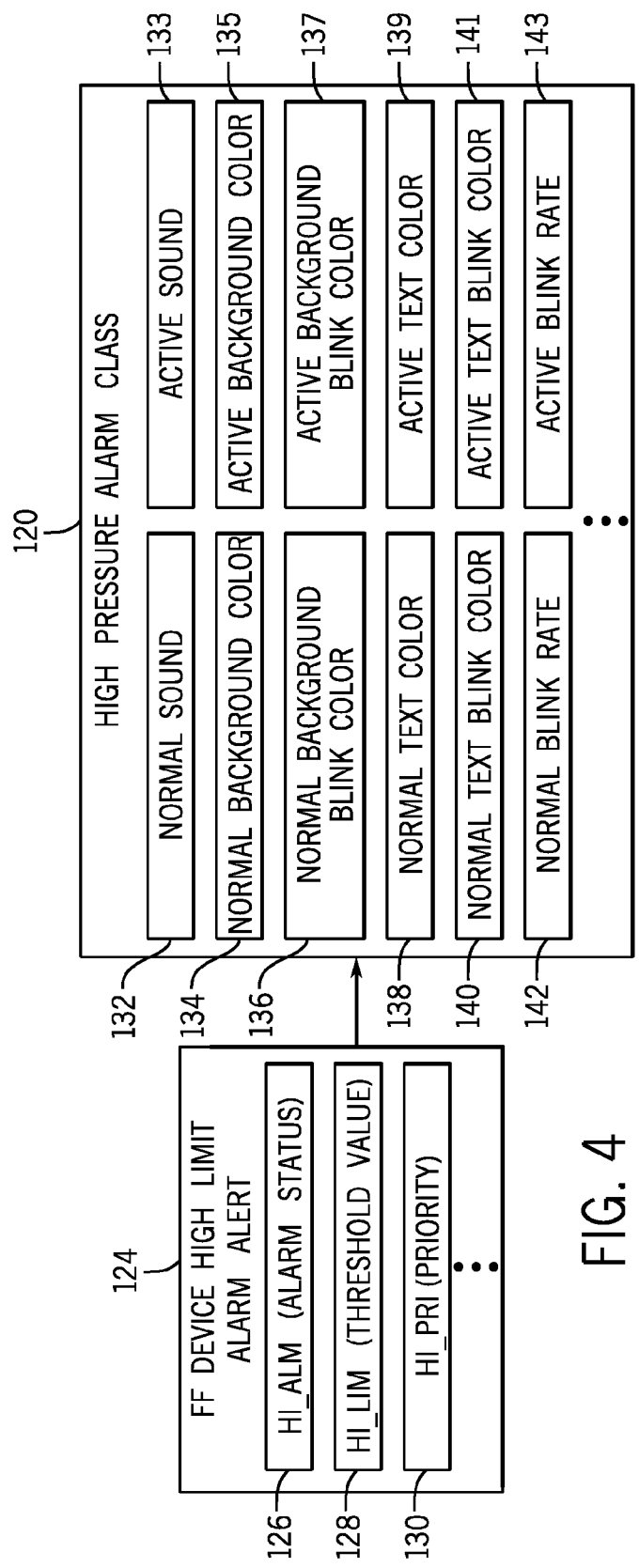
FIG. 4 is a schematic diagram illustrating the attributes of an alarm class embodiment.

As described in FIGS. 3-5, different alerts, as well as alerts from different devices on the control system network, may be presented to the operator in a different manner. That is, the operator may customize the presentation of certain FIELDBUS FOUNDATION® alerts so that, for example, more important alerts are presented in such a way as to more readily attract the operator's attention. Through interaction with a workstation of the industrial control system, an operator may define custom alarm classes that serve to wrap and extend the functionality of the underlying FIELDBUS FOUNDATION® alerts, enabling the operator to customize the presentation of each alert using various associated alarm classes.

For example, FIG. 3 illustrates an embodiment of a process 100 for creation of a custom alarm class to wrap a particular FIELDBUS FOUNDATION® alert. Some or all of the process 100 may be implemented as executable code instructions stored on non-transitory tangible machine-readable media and executed by a processor; such as the memory 72 and processor 74 of the alarm server 70, the memory 86 and processor 88 of the controllers 76, or the memory and processor of other computers of the system 10 (e.g., alarm viewers 80, computer 34, and so on). The process 100 begins with a user interface (e.g., the user interface of ToolboxST™ hosted on computer 34) receiving (block 102) a selection of a FIELDBUS FOUNDATION® alert to be wrapped by a new or existing custom alarm class. For example, the user interface may present the operator with a hierarchical or tree view of the components that are attached to the control system network, and may allow the operator to select a particular Foundation Fieldbus device. Upon selecting a device (e.g., device 40), the user interface may present the operator with a list of FIELDBUS FOUNDATION® parameters for the device, including parameters for particular alerts for the device. In certain embodiments, the various parameters for the device may be divided into a plurality of tabs (e.g., a configuration tab, an outputs tab, an alarms tab, an alarm configuration tab, etc.) in a navigation pane. For example, the operator may select the alarm configuration tab for a particular FIELDBUS FOUNDATION® device, and may be presented with a list of all of the alerts that the device supports and their associated properties.

In certain embodiments, alerts for FIELDBUS FOUNDATION® devices may include a low limit alarm alert (i.e., "LO_ALM"), a high limit alarm alert (i.e., "HI_ALM"), a critical low limit alarm alert (i.e., "LO_LO_ALM"), a critical high limit alarm alert (i.e., "HI_HI_ALM"), a deviation low alarm alert (i.e., "DV_LO_ALM"), a deviation high alarm alert (i.e., "DV_LO_ALM"), a discrete alarm alert (i.e., "DISC_ALM"), a block alarm alert (i.e., "BLOCK_ALM"), or a custom alarm alert. In general, the high and low limit alarm alerts signal when a monitored channel analog value of the device exceeds a defined threshold value. In general, the high and low deviation alarm alerts signal when a monitored channel analog value of the device deviates by at least a defined deviation threshold value. In general, the discrete alarm alert signals when a monitored channel discrete value for a device exceeds a defined threshold value. In general, block alarm alerts and custom alarm alerts may be defined within the device blocks to signal errors encountered, for example, when executing a set of instructions in the block.

Accordingly, when the operator selects a particular alert for a FIELDBUS FOUNDATION® device, the operator may be presented with an option to create a custom alarm class or to associate the alert with an existing custom alarm class. For example, the operator may perform an alternate select (e.g., using a mouse right click, or a shift key plus left mouse click combination) on a particular alert for a particular device, which may result in a context menu being presented to the operator containing options such as "Create a custom alarm class" and "Assign to an existing custom alarm class". In certain embodiments, each alert listed for a selected FIELDBUS FOUNDATION® device may contain an alarm class field that may, for example, be displayed to the operator as a select box that is populated with all existing custom alarm classes and has the currently associated custom alarm class selected and displayed. Accordingly, by using such a select box, the operator may select an existing custom alarm class to associate with a particular FIELDBUS FOUNDATION® alert. In such an embodiment, the select box may have a generic alarm class that may be selected by default and associated with an alert that does not have an associated alarm class. Additionally, in certain embodiments, such a select box may include an option, such as "Create a new custom alarm class", that may enable the operator to create a new alarm class for a particular alert.

In certain embodiments, the operator may choose to create a new custom alarm class. Accordingly, the user interface may present (block 104) to the operator (e.g., via a pop-up window or separate navigation pane) a list of alarm class attributes for the new custom alarm class. These alarm class attributes may be subsequently assigned values by the operator to define how an alarm belonging to the alarm class is to be presented. In some embodiments, the user interface may present the operator with a list (e.g., a select or combo box) of possible values for each attribute of the custom alarm class when the class is being created or edited. For example, a select box associated with a color attribute of a custom alarm class may include selectable options for some or all of the colors that the graphical user interfaces are capable of using to present an alarm. That is, the select box associated with a color attribute may be populated with strings representing different color options (e.g., "Green", "Red", "Yellow", "Orange", "Blue", etc.) and/or representation of the color itself. In certain embodiments, a new custom alarm class may be assigned default values for some or all of the attributes until they have been explicitly assigned by the user. Additionally, in certain implementations, other types of input structures, including check boxes, radio buttons, text boxes, and masked text boxes may also be used to display properties of the alarm to be viewed and edited by the operator.

In certain embodiments, the operator may choose to assign a particular alert to an existing custom alarm class rather than create a new custom alarm class. Accordingly, the user interface may present (block 104) to the operator (e.g., via a pop-up window or separate navigation pane) a list of alarm class attributes for the existing custom alarm class. In an embodiment, the user interface may query the alarm server 70 for a list of all custom alarm classes as well as their associated attributes and values. In certain embodiments, the user interface may present a single two-dimensional list (e.g., a database table view) containing all custom alarms and attributes. Moreover, in some embodiments, the user interface may present the user with a first list of custom alarm classes, and upon the user selection of a custom alarm class, the user interface may be presented with a second editable list of alarm class attributes (e.g., in a separate window or navigation pane) for the selected custom alarm class. For example, the operator may be presented with a series of select boxes that are populated with all possible values for each custom alarm class attribute, and the currently assigned value (or a human-readable form thereof) for each custom alarm class attribute may be initially selected by each select box. The operator may then use the select boxes to adjust the values of some or all of the attributes for the existing custom alarm class. In certain embodiments, other types of input structures, including check boxes, radio buttons, text boxes, and masked text boxes may also be used to display properties of the alarm to be viewed and edited by the operator.

Next, the user interface receives (block 106) one or more values for the attributes of the custom alarm class. In certain embodiments, select boxes may present the operator with a human readable list of options (e.g., "Green", "Red", etc.) for each attribute of the alarm class, while the data type and value stored for the attribute may be in a different form. That is, the actual data type for a color attribute may be numeric (e.g., a six digit hexadecimal number) and the value for the attribute may be stored as a number. For example, when an operator uses the select box to assign a color attribute a value of "Green", the actual value assigned to the color attribute may be "00FF00". By further example, the actual data type of a blink rate attribute may be a single digit integer that accepts values ranging from 0 to 3. Accordingly, the user interface may present the operator with a select box to select human readable options for each value (e.g., "no blinking"=0, "slow blinking"=1, "medium blinking"=2, "fast blinking"=3). As such, when the operator selects a human-readable option for a particular attribute of the custom alarm class, the appropriate value of the proper data type may be automatically assigned to that attribute. These custom alarm class attributes are illustrated in FIG. 4 and discussed in greater detail below.

Once the user interface has received the one or more values for the attributes of the alarm class, the user interface sends (block 108) the alarm class information to the alarm server 70. For example, the user interface may send the alarm server 70 a unique identifier for the device (e.g., a device ID) and/or a particular alert for the device (e.g., an alert ID) with which the custom alarm class may be associated. The user interface may also send one or more attributes of the custom alarm class that were assigned values by the operator. In certain embodiments, the information about the custom alarm class may be assembled into an Extensible Markup Language (XML) file to send to the alarm server 70. In some embodiments, the alarm server 70 may have a list of default values to apply to attributes that are not provided to the alarm server 70 by the user interface. In an embodiment, the data may traverse the plant data highway 22, the unit data highway 24, or both before reaching the alarm server 70.

Next, the alarm server 70 receives (block 110) and stores the alarm class information sent by the user interface. For a new custom alarm class, the alarm server 70 may create a new file or record to store the received alarm class information, while the alarm server may edit the contents of an existing file or record for an existing alarm class using the received alarm class information. Additionally, the alarm server may associate the custom alarm class with the specified device and/or alert. As such, when the specified FIELDBUS FOUNDATION® alert is received by the alarm server 70 for the specified FIELDBUS FOUNDATION® device, the alarm server 70 may be able to locate the custom alarm class information associated with the received alert.

As mentioned above, a custom alarm class is designed to be associated with an underlying FIELDBUS FOUNDATION® alert in order to provide additional attributes or parameters pertaining to the presentation of the alert. For example, FIG. 4 depicts a custom alarm class 120 (e.g., created by the process described above in FIG. 3) and a corresponding FIELDBUS FOUNDATION® alert 124 in accordance with an embodiment of the present invention. More specifically, FIG. 4 illustrates an operator-defined custom alarm class, "High Pressure Alarm" class 120, which has been assigned to wrap a FIELDBUS FOUNDATION® Device "High Limit Alarm Alert" 124 (i.e., "HI_ALM") for a particular FIELDBUS FOUNDATION® device. Accordingly, when the "High Limit Alarm Alert" 124 reaches the alarm server 70, the alarm server 70 may rely upon the operator-defined attributes in the "High Pressure Alarm" class when determining how the alarm will be presented to the operator (e.g., on the HMI 12 or alarm viewers 80).

As such, the FIELDBUS FOUNDATION® device's "High Limit Alarm Alert" may include several parameters as defined by the FIELDBUS FOUNDATION® protocol. As illustrated in FIG. 4, these parameters may include an alarm status 126 (i.e., the current state of the high alarm, "HI_ALM"), a threshold value 128 (i.e., the limit beyond which the high limit alarm is considered active, "HI_LIM"), a priority 130 (i.e., the priority of the high limit alarm alert, "HI_PRI"), and so forth, according to the FIELDBUS FOUNDATION® protocol. In contrast, the illustrated "High Pressure Alarm" class 120 includes several parameters that define how the underlying "High Limit Alarm Alert" 124 should be presented as an alarm.

As illustrated in FIG. 4, the customized "High Pressure Alarm" class 120 may include attributes such as normal sound 132, normal background color 134, normal background blink color 136, normal text color 138, normal text blink color 140, and normal blink rate 142, all of which define the appearance and behavior for an alarm when it is in a normal (i.e., healthy or non-alarmed) state. Also illustrated in FIG. 4, the customized "High Pressure Alarm" class 120 may include attributes such as active sound 133, active background color 135, active background blink color 137, active text color 139, active text blink color 141, and active blink rate 143, all of which define the appearance and behavior for an alarm when it is in an active (i.e., unhealthy or alarmed) state. For example, the "High Pressure Alarm" class may have a normal background color attribute 134 assigned a value corresponding to one color (e.g., "Green") and an active background color attribute 135 assigned a value corresponding to a different color (e.g., "Red"). By further example, the "High Pressure Alarm" class may have a normal sound 132 attribute assigned a value corresponding to no audible alarm (e.g., 0) and an active sound attribute 133 assigned a value corresponding to a single beep (e.g., 1). Accordingly, by assigning values to the attributes of the "High Pressure Alarm" class 120, the operator may define the appearance and behavior of the "High Pressure Alarm" 124 when it is presented to the operator.

FIG. 5 illustrates a process 150 for presenting an alarm to an operator using custom alarm class attributes in accordance with an embodiment of the present invention. Some or all of the process 150 may be implemented as executable code instructions stored on non-transitory tangible machine-readable media and executed by a processor, such as the memory 72 and processor 74 of the alarm server 70, the memory 86 and processor 88 of the controllers 76, or the memory and processor of other computers of the system 10 (e.g., alarm viewers 80, computer 34, and so on). The process begins with the FIELDBUS FOUNDATION® device providing (block 152) a FIELDBUS FOUNDATION® alert to the controller 26 containing an alarm condition. For example, device 40 may have a "High Limit Alarm Alert" (i.e., "HI_ALM") set with a particular threshold value (i.e., "HI_LIM") beyond which the alert is triggered and sent to the controller 26. In some embodiments, the alert may traverse the H1 network 52, one or more linking devices 48, and the HSE Network 50 to arrive at the controller 26.

Once the controller 26 has received the "High Limit Alarm Alert" (i.e., "HI") from the FIELDBUS FOUNDATION® device 40, the controller 26 informs the alarm server 70 that a FIELDBUS FOUNDATION® alert has been received for the device 40 (block 154). In some embodiments, the message may traverse the unit data highway 24, the plant data highway 22, or both, before reaching the alarm server 70. In other embodiments, the alarm server 70 may poll the controller 26 at regular intervals to determine if any alerts have been received. Regardless, the controller 26 provides the alarm server 70 with unique identifiers for the device (e.g., a device ID) and/or the alert (e.g., an alarm ID). In some embodiments, the controller 26 may provide additional information to the alarm server 70, such as a timestamp for the alert event.

Next, the alarm server 70 may next determine (block 156) if the alert received from the controller 26 has an associated alarm class. As described above, alerts having associated custom alarm classes, as well as alerts not having associated alarm classes, may be sent to the alarm server 70. Accordingly, the alarm server 70 may utilize the unique identifiers for the device and/or the alert that were provided by the controller 26 to resolve (e.g., via a database or query) which custom alarm class is associated with the received alert.

If an associated custom alarm class is located for the received alert, the alarm server 70 uses (block 158) the values of the alarm class attributes when instructing a graphical user interface, such as the alarm viewers 80, how to present the alert to the operator. In certain embodiments, the alarm server 70 may have a default alarm class defined whose attribute values may be applied when presenting alerts to the operator, when the received alert is not associated with a particular custom alarm class.

Technical effects of the invention include enabling an operator to customize the presentation of FIELDBUS FOUNDATION® alerts. As such, alarm classes may be configured to present critical alerts in an operator-defined fashion so as to be quickly noted, while other alarm classes may be configured to present non-critical alerts in an operator-defined fashion so as not to be distracting from more important alerts in the system. Additionally, the embodiments of the invention may reduce operator error and delay in interpreting and responding to alerts. Further, by enabling operator customization, alarms may be able to accommodate operator preference as well as operator handicaps (e.g., color blindness, hearing impairment, etc.) that a non-customizable alarm system may not be equipped to accommodate. Additionally, the custom alarm classes may enable the continued use of the Foundation Fieldbus protocol for the lower levels of the control system network, while extending functionality (i.e., customized alarm presentation) for the upper levels of the control system network (i.e., HMI 14, alarm viewers 80, etc.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial process control system, comprising:
   a field device configured to provide an alert;
   a graphical user interface configured to present an alarm for the alert; and
   an alarm server comprising a processor and configured to associate an alarm class with the alert, wherein the alarm class comprises a plurality of alarm attributes having a respective plurality of values, wherein the graphical user interface is configured to present the alarm for the alert based on the plurality of alarm attributes and the respective plurality of values.

2. The system of claim 1, wherein the field device is configured to communicate with the alarm server using a FIELDBUS FOUNDATION® H1 protocol, a HART® Communications Foundation (HCF) protocol, a PROFIBUS® Nutzer Organization (PNO) protocol, or a combination thereof.

3. The system of claim 1, further comprising a controller configured to receive the alert from the field device and transmit an acknowledgment to the alarm server that the alert has been received from the field device.

4. The system of claim 3, further comprising a plant data highway, a unit data highway, a high speed Ethernet Network, a linking device, and a Foundation H1 network, wherein the graphical user interface is coupled to the plant data highway or the unit data highway, the alarm server is coupled to the unit data highway, the controller is coupled to the unit data highway and the high speed Ethernet network, the linking device is configured to link the high speed Ethernet network to the Foundation H1 network, and the field device is coupled to the Foundation H1 network.

5. The system of claim 1, wherein the graphical user interface is disposed on a human-machine interface (HMI) system, a manufacturing execution system (MES), a distributed control system (DCS), a supervisor control and data acquisition (SCADA) system, or an alarm viewer.

6. The system of claim 1, wherein the graphical user interface is configured to receive the plurality of values for the plurality of alarm attributes and to send the plurality of values to the alarm server.

7. The system of claim 1, wherein the plurality of alarm attributes comprises:
a plurality of normal alarm attributes that are associated with a healthy or non-alarmed state of the field device, wherein the plurality of normal alarm attributes comprises a normal sound, a normal background color, a normal background blink color, a normal text color, a normal text blink color, or a normal blink rate; and
a plurality of active alarm attributes that are associated with an unhealthy or alarmed state of the field device, wherein the plurality of active alarm attributes comprises an active sound, an active background color, an active background blink color, an active text color, an active text blink color, or an active blink rate.

8. The system of claim 1, wherein the alert comprises one or more of a low limit alarm alert, a high limit alarm alert, a critical low limit alarm alert, a critical high limit alarm alert, a deviation low alarm alert, a deviation high alarm alert, a discrete alarm alert, a block alarm alert, or a custom alarm alert.

9. A method, comprising:
receiving an alert from a field device of an industrial control system;
resolving the alert to an associated alarm class, wherein the associated alarm class comprises a plurality of presentation attributes not defined by the alert; and
instructing a user interface to display an alarm for the alert based on a respective plurality of values of the plurality of presentation attributes for the associated alarm class.

10. The method of claim 9, wherein resolving the alert comprises using a unique identifier from the alert to determine the associated alarm class.

11. The method of claim 9, wherein receiving the alert comprises receiving the alert from a controller of the industrial control system coupled to the field device.

12. The method of claim 11, wherein the field device is configured to communicate with the controller using a FIELDBUS FOUNDATION® H1 protocol, a HART® Communications Foundation (HCF) protocol, a PROFIBUS® Nutzer Organization (PNO) protocol, or a combination thereof.

13. The method of claim 9, wherein the alert for the field device comprises one or more of a low limit alarm alert, a high limit alarm alert, a critical low limit alarm alert, a critical high limit alarm alert, deviation low alarm alert, a deviation high alarm alert, a discrete alarm alert, or a block alarm alert.

14. The method of claim 9, wherein the plurality of presentation attributes comprises:
a plurality of normal presentation attributes that are associated with a healthy or non-alarmed state of the field device, wherein the plurality of normal presentation attributes comprises a normal sound, a normal background color, a normal background blink color, a normal text color, a normal text blink color, or a normal blink rate; and
a plurality of active presentation attributes that are associated with an unhealthy or alarmed state of the field device, wherein the plurality of active presentation attributes comprises one or more of: an active sound, an active background color, an active background blink color, an active text color, an active text blink color, or an active blink rate.

15. A non-transitory, tangible computer readable medium comprising executable code, the code comprising instructions for:
receiving a selection of an alert of a field device from a user interface;
defining an alarm class, wherein the alarm class comprises a plurality of presentation attributes having a respective plurality of values; and
associating the alarm class with the alert of the field device.

16. The non-transitory, tangible computer readable medium of claim 15, wherein the code further comprises instructions for displaying the alarm based on the plurality of presentation attributes of the alarm class.

17. The non-transitory, tangible computer readable medium of claim 15, wherein the field device is configured to communicate with a controller using a FIELDBUS FOUNDATION® H1 protocol, a HART® Communications Foundation (HCF) protocol, a PROFIBUS® Nutzer Organization (PNO) protocol, or a combination thereof.

18. The non-transitory, tangible computer readable medium of claim 15, wherein the plurality of presentation attributes comprises:
a plurality of normal presentation attributes that are associated with a healthy or non-alarmed state of the field device, wherein the plurality of normal presentation attributes comprises a normal sound, a normal background color, a normal background blink color, a normal text color, a normal text blink color, or a normal blink rate; and
a plurality of active presentation attributes that are associated with an unhealthy or alarmed state of the field device, wherein the plurality of active presentation attributes comprises an active sound, an active background color, an active background blink color, an active text color, an active text blink color, or an active blink rate.

19. The non-transitory, tangible computer readable medium of claim 15, wherein the user interface comprises a user interface on a human-machine interface (HMI) system, a manufacturing execution system (MES), a distributed control system (DCS), a supervisor control and data acquisition (SCADA) system, or an alarm viewer.

20. The non-transitory, tangible computer readable medium of claim 15, wherein the alert comprises one or more of a low limit alarm alert, a high limit alarm alert, a critical low limit alarm alert, a critical high limit alarm alert, a deviation low alarm alert, a deviation high alarm alert, a discrete alarm alert, a block alarm alert, or a custom alarm alert.

* * * * *